Patented Apr. 27, 1943

2,317,607

UNITED STATES PATENT OFFICE 2,317,607

COMPOSITIONS OF MATTER AND METHODS AND STEPS OF MAKING AND USING THE SAME

Mortimer T. Harvey, East Orange, N. J., assignor, by mesne assignments, to The Harvel Corporation, a corporation of New Jersey No Drawing. Application November 15, 1937, Serial No. 174,662

12 Claims. (Cl. 260—613)

The present invention relates to the process which comprises condensing a phenol to the unsaturated bond of a phenolic compound having a substituent containing an ethylenic linkage and the present invention relates to the reaction products of the process and to the methods and steps of making and using the products.

The products of the present invention are complex phenolic condensation products and comprise (1) compounds in which carbon atoms of the carbocyclic groups of otherwise separated phenols are connected to a common hydrocarbon radicle in substituted relation; and (2) compounds in which a carbocyclic carbon of a phenol group and an oxygen atom of another phenolic group are connected to a common hydrocarbon radicle, the one in substituted relation and the other in ether relation. And, further, the products of the present invention comprise phenolic ethers of the compounds of items (1) and (2), above, in which hydrocarbon radicles have been substituted for any or all of the phenolic hydrogens of the compounds of said items (1) and (2).

In the reactions and the products of the present invention the phenolic groups involved can be of the monohydric or the polyhydric type.

The condensation reactions of the present invention are produced with the aid of kationic agents also termed katenoid condensing agents and examples of which are sulphuric acid, aluminum chloride, zinc chloride, phosphorous oxychloride and phosphoric acid.

Following are illustrative examples of phenols, having unsaturated hydrocarbon substituents, which are suitable for use in the practice of the present invention: cashew nut shell liquid and the separate phenolic constituents thereof, namely, anacardic acid and cardol; "Cardanol," which is obtained by distilling the anacardic acid constituent and thereby dissociating therefrom carbon and oxygen atoms other than those of the phenol nucleus and the unsaturated hydrocarbon substituent; marking nut shell liquid and the phenolic constituents thereof such as anacardol; urushiol.

Examples of phenolic radicles are those of phenol (carbolic acid) also known as hydroxybenzene and its homologues including various ones of the cresols and xylenols. Examples of unsaturated hydrocarbon substituent radicles are the hydrocarbon substituent in indene, and also the following radicles, the crotyl, allyl, the methyl and other derivatives of the allyl, the vinyl, the propenyl, the isopropenyl and the several normal and iso alkyl and alkoxy derivatives of the vinyl, propenyl and allyl (e. g. methyl and methoxy), and the cyclohexene radicle. These radicles classed generally are olefinic and unsaturated cyclo hydrocarbons, having an unsaturated bond at some place in the radicle.

The aryl nucleus can be phenyl, naphthyl, anthranyl and various of the homologues thereof such as those of the various of the cresols and xylenols and of the corresponding or analogous naphthols and anthranols.

The compounds of the present invention can be represented by the following formulas:

(I)

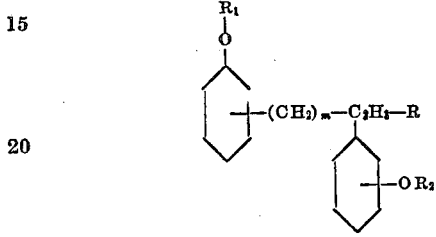

and (II)

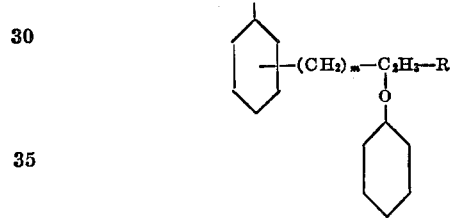

where $m$ is zero or a finite integer, each of R, $R_1$ and $R_2$ can be hydrogen or a hydrocarbon radicle, and each carbocyclic group can be phenyl, naphthyl or anthranyl nucleus, and each carbocyclic group can have attached one or more additional alkyl, hydroxy or alkoxy radicles.

The two formulas (I) and (II) can be condensed to (III)

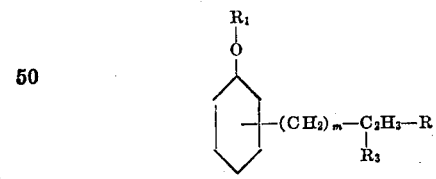

where $R_3$ is an oxy aryl group.

In those cases where $R_1$ is to be a hydrocarbon group, this group can be added after the condensation reaction, or the starting phenolic material having the unsaturated substituent can be a phenolic ether. If the hydrocarbon $R_1$ group is put on after the condensation reaction and the condensation product comes under Formula I, above, then $R_2$ also can be changed from hydrogen to hydrocarbon.

Illustrative specific examples of phenols with unsaturated side chains reacted with other phenols:

Example 1.—"Cardanol" and phenol (carbolic acid).
($HOC_6H_4C_{14}H_{27}$ and $C_6H_5OH$)

Example 2.—Allyl phenol and phenol.
Example 3.—Cashew nut shell liquid and cresylic acid.
Example 4.—Dihydroxy urushiol and ortho cresol
Example 5.—Allyl phenol and ortho cresol.
Example 6.—"Cardanol" and allyl phenol.

Example I.—288 parts by weight of "Cardanol" and 94 parts of phenol are added to a solution of 108 parts of concentrated sulphuric acid in 525 parts of glacial acetic acid and left to stand overnight after which the mixture is refluxed for 5 hours. After this the mixture is poured into 2000 parts of hot water (60° C.) and sodium chloride added to cause coagulation and separation. A dark red oil, which separates on top and which can be distilled, is the cardanol phenol condensation product.

Example II.—Cashew liquid, cresol and sulphuric acid, 300 parts by weight of cashew nut shell liquid and 104 parts by weight of a mixture of 50 per cent of ortho cresol, 30 per cent of phenol and 20 per cent of meta para cresol are added together and chilled in an ice bath. To this mixture is added, drop by drop, about 100 parts by weight of conc. sulphuric acid, keeping the temperature below 25° C., after which the mixture is left to stand at room temperature for four days and then washed with water and dehydrated by heating to 130° C.

Example III.—300 parts by weight of cashew nut shell liquid and 104 parts of the phenol-cresol mixture mentioned in Example II are mixed together and to this mixture is added a solution of 108 parts of concentrated sulphuric acid which has previously been dissolved in about eight times its volume of mono isopropyl acid sulphate. The mixture is allowed to stand for 3 days at room temperature after which it is poured into water and the mixture brought to a boil and separation allowed to take place over night. The resulting product is dehydrated at low temperature, for example, by heating to 100° C to 105° C.

Example IV.—133 parts by weight of ortho allyl phenol and 94 parts of phenol (carbolic acid) are mixed together to which mixture is added about 98 parts by weight of concentrated sulphuric acid dissolved in about nine times its volume of glacial acetic acid and the whole refluxed 5 hours after which the product is diluted with water and the layers separated. The water layer is removed and the resulting phenol distilled under vacuum.

Example V.—One molecular weight of cashew nut shell liquid (about 288) and two moles of phenol (carbolic acid) are mixed together and cooled to about 20° C. To this mixture is added slowly about 200 parts by weight of conc. sulphuric acid, keeping the temperature at about 20° C., after which the mixture is left to stand for about four days and then washed with water and dehydrated by heating to 130° C.

Uses.—The products of these reactions are considered to be double phenols and they can be used for germicidal and insecticidal purposes by dispersing in an alkaline medium. They also can be reacted with aldehydes such as hexamethylene tetramine, water solution of formaldehyde, or paraformaldehyde with the aid of heat to obtain oil soluble resinous products for varnishes, paints, etc. They can be treated so that phenolic groups are converted to ether groups, for example, by reacting with diethyl-sulphate and sodium hydroxide, the latter either in water or alcohol solution or in powdered form. These double phenols, the products of the above reactions, can be sulphonated and used for wetting agents, dye bases and perfume bases. The products of the above reactions can be used with cellulose compounds as plasticizers, and with rubber, rubber compounds and synthetic rubber as a softener.

Having thus described my invention, what I claim and desire to protect by Letters Patent is:

1. The method which comprises subjecting a mixture of a phenol of the class consisting of hydroxybenzene, naphthol and anthranol and their homologues with a phenol having an unsaturated hydrocarbon substituent to a condensing reaction in the presence of a katenoid condensing agent.

2. The method which comprises subjecting a mixture of a phenol of the class consisting of hydroxybenzene, naphthol and anthranol and their homologues with cardanol to a condensing reaction in the presence of a katenoid condensing agent.

3. The method which comprises subjecting a mixture of a phenol of the class consisting of hydroxybenzene, naphthol and anthranol and their homologues with cashew nut shell liquid to a condensing reaction in the presence of a katenoid condensing agent.

4. The method which comprises subjecting a mixture of cardanol and hydroxybenzene to a condensing reaction in the presence of a katenoid condensing agent.

5. The method which comprises subjecting a mixture of cashew nut shell liquid and hydroxybenzene to a condensing reaction in the presence of a katenoid condensing agent.

6. The method which comprises subjecting a mixture of cardanol and a xylenol to a condensing reaction in the presence of a katenoid condensing agent.

7. The complex phenolic condensation product produced by subjecting a mixture of a phenol of the class consisting of hydroxybenzene, naphthol and anthranol and their homologues with a phenol having an unsaturated hydrocarbon substituent to a condensing reaction in the presence of a katenoid condensing agent.

8. The complex phenolic condensation product produced by subjecting a mixture of a phenol of the class consisting of hydroxybenzene, naphthol and anthranol and their homologues with cardanol to a condensing reaction in the presence of a katenoid condensing agent.

9. The complex phenolic condensation product produced by subjecting a mixture of a phenol of the class consisting of hydroxybenzene, naphthol and anthranol and their homologues with cashew nut shell liquid to a condensing reaction in the presence of a katenoid condensing agent.

10. The complex phenolic condensation product produced by subjecting a mixture of cardanol and hydroxybenzene to a condensing reaction in the presence of a katenoid condensing agent.

11. The complex phenolic condensation product produced by subjecting a mixture of cashew nut shell liquid and hydroxybenzene to a condensing reaction in the presence of a katenoid condensing agent.

12. The complex phenolic condensation product produced by subjecting a mixture of cardanol and a xylenol to a condensing reaction in the presence of a katenoid condensing agent.

MORTIMER T. HARVEY.